May 11, 1937.　　　　　D. JONES　　　　　2,079,804

DRAFT REGULATOR

Filed Sept. 28, 1934

INVENTOR.
Don Jones.

BY Carroll R. Taber

HIS ATTORNEY.

UNITED STATES PATENT OFFICE 2,079,804

DRAFT REGULATOR

Don Jones, Lansing, Mich., assignor to Motor Wheel Corporation, Lansing, Mich., a corporation of Michigan Application September 28, 1934, Serial No. 745,969

3 Claims. (Cl. 236—45)

This invention relates to automatic draft regulators of the type suitable for use in controlling the draft for combustion apparatus operated by natural or induced draft. The invention is especially adapted for use in connection with oil burning apparatus. Generally speaking combustion apparatus of the character under consideration is designed to produce the best results within a rather limited range of draft pressures. For example, oil burning combustion apparatus is usually designed for a draft pressure corresponding to the pressure of a column of water from approximately .04 to .12 inch in height. Consequently an automatic draft regulator for such apparatus should be capable of maintaining any desired pressure within these limits.

One of the problems in connection with automatic draft regulators is to make them so that they may be readily adjusted to maintain the desired draft pressure without employing an excessive number of complicated parts. It is an object of the present invention to provide a draft regulator of simple and economical construction which may be readily adjusted exteriorly thereof to maintain any desired draft within predetermined limits. This object is accomplished primarily by the provision of a novel construction and arrangement of the parts of the adjustable counter-balancing mechanism.

In the device constructed in accordance with the present invention the counter-balancing mechanism is arranged whereby to obtain any desired draft pressure within predetermined limits by rotating a shaft mounted on the damper valve through less than one complete revolution. A weight is secured to the inner end of the shaft which is moved toward or away from the damper valve upon rotation of the shaft. An indicating arm is secured to the outer extremity of the shaft in operative relation to an indicator dial whereby the relative position of the weight with respect to the damper valve is indicated on said indicator dial for all positions of the weight.

By this mechanism it is possible to maintain any desired draft pressure in the apparatus with which it is associated merely by setting the indicating arm at the desired point on the indicator dial. The location of the pivotal axis of the damper valve, the position of the counter balancing weight with respect to such axis and the limits of movement of the weight with respect to the damper valve are all important factors in accomplishing this result.

An illustrative embodiment of the invention is shown in the accompanying drawing wherein.

Figure 1:
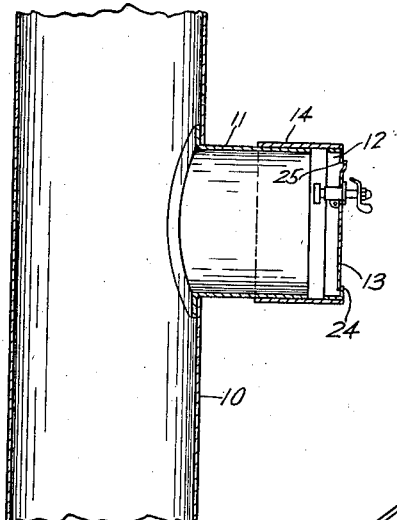
Figure 1 is a partial sectional view of a conventional chimney flue having an automatic draft regulator associated therewith.

In Figure 1 there is shown a section of a conventional flue connection 10 such as is usually employed with combustion apparatus of various types. The upper portion of the flue 10 will be connected to a chimney and the lower portion to the flue outlet of the combustion apparatus with which it is associated. During operation of the combustion apparatus associated with the flue connection 10, a draft or vacuum is created within the flue 10 whereby air is drawn into the combustion apparatus and the products of combustion are drawn out of the combustion apparatus.

For the purpose of maintaining a constant draft pressure within the apparatus connected to the flue 10 an automatic draft regulator is associated with one end of a horizontal pipe connection 11 which communicates with the interior of flue 10 at its other end. It will of course be understood that when the damper forming a part of the automatic draft regulator is closed there is no effect upon the draft within the flue 10 but that when the damper is opened the draft communicated to the combustion apparatus associated with the flue 10 is reduced.

The automatic draft regulator includes a collar 12, a damper valve 13 pivotally mounted within the collar and adjustable counter-balancing mechanism by means of which the resistance of damper 13 to the draft pressure within the flue 10 is varied. The collar 12 may be mounted within the end of a pipe connection such as illustrated at 14 which is adapted to be fitted over the end of pipe 11.

Figure 2:
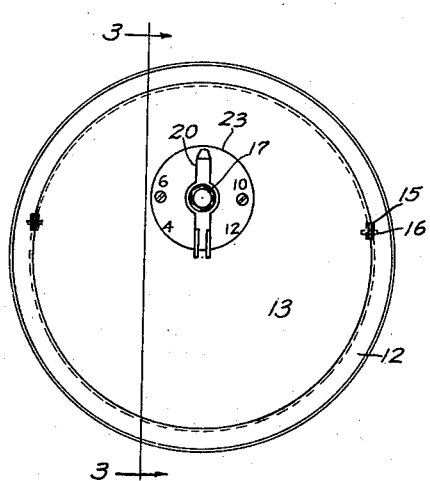
Figure 2 is a front view of the draft regulator illustrated in Figure 1.

Any desired mechanism may be employed for pivotally mounting damper 13 within the collar 12. As here shown the damper is equipped with a pair of flanges 15 at opposite sides thereof through which pins 16 secured to the collar 12 project. It will be observed, by reference to Figure 2, that the pivotal axis of damper valve 13 is parallel to the horizontal center line thereof but spaced vertically thereabove. Thus the center of mass of damper valve 13 is below its pivotal axis. Consequently, when the pressure on opposite sides of the damper valve is the same the valve tends to remain in the vertical position shown in Figures 1 and 2.

The adjustable counter-balancing mechanism consists of a shaft 17 slidably and rotatably mounted within a sleeve 18 which is permanently attached to damper valve 13. A weight 19 is rigidly attached to the inner extremity of shaft 17 and a combination handle and indicating arm 20 is rigidly attached to the outer extremity of the shaft.

Figure 4:
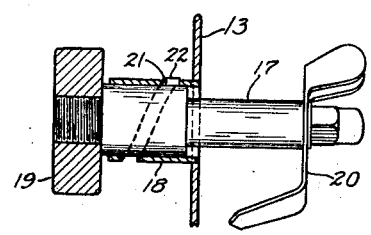
Figure 4 is a cross sectional view of the adjustable counter-balancing mechanism forming a part of the draft regulator illustrated in Figures 1, 2 and 3.

As clearly shown in Figure 4 that portion of shaft 17 adjacent its inner extremity which is positioned within sleeve 18 is slightly enlarged. Sleeve 18 is provided with a helical slot or channel 21 which receives a guide pin or projection 22 carried by the enlarged portion of shaft 17. When shaft 17 is rotated by turning the arm 20 it moves longitudinally within sleeve 18 by reason of the relation between guide pin 22 and channel 21. In this manner the position of weight 19 with respect to damper valve 13 may be varied by rotating shaft 17.

Helical channel 21 extends only partially around the sleeve 18 so that the rotary movement of shaft 17 is limited to less than one complete revolution. The pitch of channel 21 is designed to permit sufficient lateral movement of weight 19 to maintain the desired draft pressure in the combustion apparatus connected to flue 10 regardless of the pressure in the flue itself above the draft regulator.

As previously mentioned the automatic draft regulator embodying the present invention is of a type adapted for use in connection with combustion apparatus designed for operation between drafts from approximately .04 to .12. An indicating dial 23 calibrated from .04 to .12 is secured to the outer surface of damper valve 13 surrounding shaft 17. The calibrations on dial 23 are positioned so that when the indicator arm 20 points to .04 the weight 19 is positioned with respect to damper valve 13 whereby the damper will remain closed so long as the draft pressure within the flue 10 does not exceed .04 but to open in case the draft pressure does exceed that amount. Thus there is maintained in the combustion apparatus associated with flue 10 a draft pressure of not to exceed .04.

The helical channel 21 is arranged so that the indicating arm 20 points to .04 (Figure 2) when the weight 19 is in its retracted position, adjacent valve 13; and so that the indicating arm 20 points to numeral 12 when the weight 19 is in its extended position, away from valve 13. Consequently, the relative position of weight 19 with respect to damper valve 13 is visually recorded on the dial 23 exteriorly of the draft regulator for all positions of the weight 19. It will of course be understood that the size of weight 19, the position thereof both horizontally and vertically with respect to the pivotal axis of damper 13 and the pitch of channel 21 are all designed to vary the resistance of damper 13 to differences in pressure on its opposite sides whereby to maintain within the combustion apparatus connected to flue 10 a draft corresponding approximately to the numeral indicated by indicating arm 20.

By reason of the arrangement shown and described, it is essential that provisions be made to prevent the lower portion of damper 13 from swinging outwardly and to limit the extent of its inward movement. The outward movement of the lower portion of damper 13 (counter-clockwise rotation) is prevented by stops 24 and 25 in the form of flanges at the lower and upper extremities respectively of collar 12. The lower and upper portions of damper valve 13 strike stops 24 and 25 as shown in Figure 1.

Figure 3:
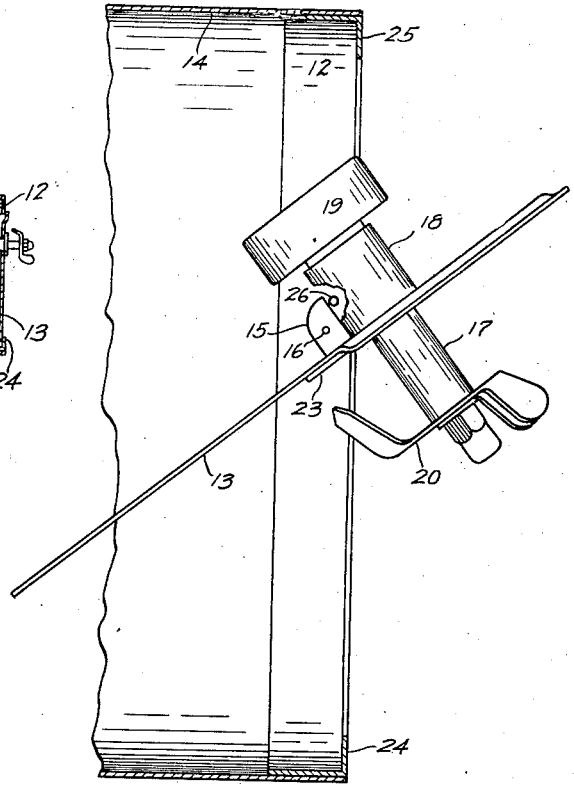
Figure 3 is a sectional view of the draft regulator taken on substantially the line 3—3 of Figure 2 showing the damper valve in its open position.

The inward movement of the lower portion of damper 13 (clockwise rotation) is limited to less than one-quarter of a complete revolution by means of stops 26 in the form of pins projecting inwardly from the opposite sides of collar 12 somewhat above the pins 16. As clearly shown in Figure 3 the flanges 15 formed at the opposite sides of damper 13 strike pins 26 when damper 13 is rotated in a clockwise direction whereby to prevent the damper from swinging to a reverse position with the weight 19 below the pivotal axis of the damper.

When indicating arm 20 points to .04 on indicator dial 23, the effect of weight 18 is just sufficient to counter balance the effect of a draft of .04 within the flue 10, and thereby maintain damper 13 in its closed position. By turning indicating arm 20 so that it points to .12, the effect of weight 18 is increased whereby it is sufficient to counter balance the effect of a pressure of .12 within the flue 10. A corresponding variation in the counter balancing effect of weight 18 is obtained by setting indicating arm 20 at any intermediate point.

A complete range of adjustment within the desired limits is obtained by rotating shaft 17 through less than one complete revolution and all adjustments are indicated on the dial 23. These advantageous results are made possible by the particular arrangement employed, namely: the location of the pivoted axis of damper 13 above its horizontal center-line, the location of shaft 17 above the pivoted axis of damper 13, the size of weight 18 and the extent and pitch of channel 21.

While only the preferred embodiment of the present invention has been shown and described, it should be understood that various modifications thereof may be employed within the scope of the invention as defined by the appended claims.

1. An automatic draft regulator comprising a collar, a damper valve pivotally mounted in the collar to normally close one end thereof, a shaft slidably and rotatably mounted in the damper above its pivotal axis, a weight secured to the inner end of the shaft, a radially extending indicating arm secured to the outer end of the shaft, an indicator dial operatively associated with the indicating arm, said shaft being adapted to move longitudinally upon being rotated whereby to vary the distance between the weight and the damper, and means for limiting the rotary movement of said shaft to less than one complete revolution whereby all positions of the weight relative to the damper are indicated on the indicator dial by the indicating arm.

2. A device of the character described including a damper pivotally mounted in a collar, and means for varying the resistance of the damper to rotary movement comprising a sleeve secured to the damper and having a helical channel formed therein, a shaft rotatably mounted within said sleeve with a projection extending into said channel, and a weight secured to the inner end of the shaft, whereby upon rotation of the shaft the distance between the weight and the damper is varied.

3. An automatic draft regulator comprising a damper valve with an opening therein, a sleeve secured to the valve around said opening, a helical channel formed interiorly of said sleeve, said channel extending substantially the entire length of said sleeve but only part way around the sleeve, and a shaft slidably and rotatably mounted in said sleeve with a projection extending into said channel, one end of said shaft being weighted.

DON JONES.